US008219803B2

(12) United States Patent
Merrifield

(10) Patent No.: US 8,219,803 B2
(45) Date of Patent: Jul. 10, 2012

(54) SYSTEM AND METHOD FOR UNLOCKING CONTENT ASSOCIATED WITH MEDIA

(75) Inventor: Lane Merrifield, Kelowna (CA)

(73) Assignee: Disney Enterprises, Inc., Burbank, CA (US)

( * ) Notice: Subject to any disclaimer, the term of this patent is extended or adjusted under 35 U.S.C. 154(b) by 485 days.

(21) Appl. No.: 12/321,231

(22) Filed: Jan. 19, 2009

(65) Prior Publication Data

US 2010/0100726 A1 Apr. 22, 2010

Related U.S. Application Data

(60) Provisional application No. 61/196,875, filed on Oct. 20, 2008.

(51) Int. Cl.
*H04L 29/06* (2006.01)

(52) U.S. Cl. ........ 713/155; 713/171; 713/178; 713/189; 705/400

(58) Field of Classification Search .................. 713/150, 713/155; 380/149, 150, 229, 232, 247–250
See application file for complete search history.

(56) References Cited

U.S. PATENT DOCUMENTS

| 6,002,772 | A  | * | 12/1999 | Saito ............................. 705/58 |
| 7,353,541 | B1 | * | 4/2008  | Ishibashi et al. ................ 726/26 |
| 7,533,224 | B2 | * | 5/2009  | Takashima ..................... 711/154 |
| 7,725,400 | B2 | * | 5/2010  | Shionoya et al. ................ 705/59 |
| 7,805,616 | B1 | * | 9/2010  | Mohammed et al. ......... 713/189 |
| 7,831,043 | B2 | * | 11/2010 | Lotspiech ...................... 380/201 |
| 8,121,952 | B2 | * | 2/2012  | Collar et al. ..................... 705/51 |
| 2004/0210765 | A1 | * | 10/2004 | Erickson ....................... 713/200 |
| 2005/0094500 | A1 | * | 5/2005  | Wu et al. ...................... 369/30.1 |
| 2007/0113095 | A1 | * | 5/2007  | Marui et al. .................. 713/178 |
| 2007/0294544 | A1 | * | 12/2007 | Ishikawa et al. .............. 713/193 |
| 2008/0249961 | A1 | * | 10/2008 | Harkness et al. ............. 705/400 |
| 2009/0006796 | A1 | * | 1/2009  | Chang et al. .................. 711/163 |
| 2010/0005301 | A1 | * | 1/2010  | Asano et al. .................. 713/171 |

OTHER PUBLICATIONS

Ross King, Niko Popitsch, Utz Westermann; METIS: a Flexible Database Foundation for Unified Media Management; Oct. 2004; ACM; pp. 1-2.*

* cited by examiner

*Primary Examiner* — Christopher J Brown
*Assistant Examiner* — Fahimeh Mohammadi
(74) *Attorney, Agent, or Firm* — Farjami & Farjami LLP

(57) ABSTRACT

There is presented a system and method for unlocking a content associated with media. In one aspect, the method comprises identifying the media, generating an authentication key using at least one key data from a set of key data contained in the media, determining an address in the media of at least one content unit corresponding respectively to each of the at least one key data used to generate the authentication key; requesting the at least one content unit by providing the address; receiving user data in response to the requesting; comparing the user data with the at least one key data used to generate the authentication key; and unlocking the content associated with the media if the user data matches the authentication key.

17 Claims, 4 Drawing Sheets

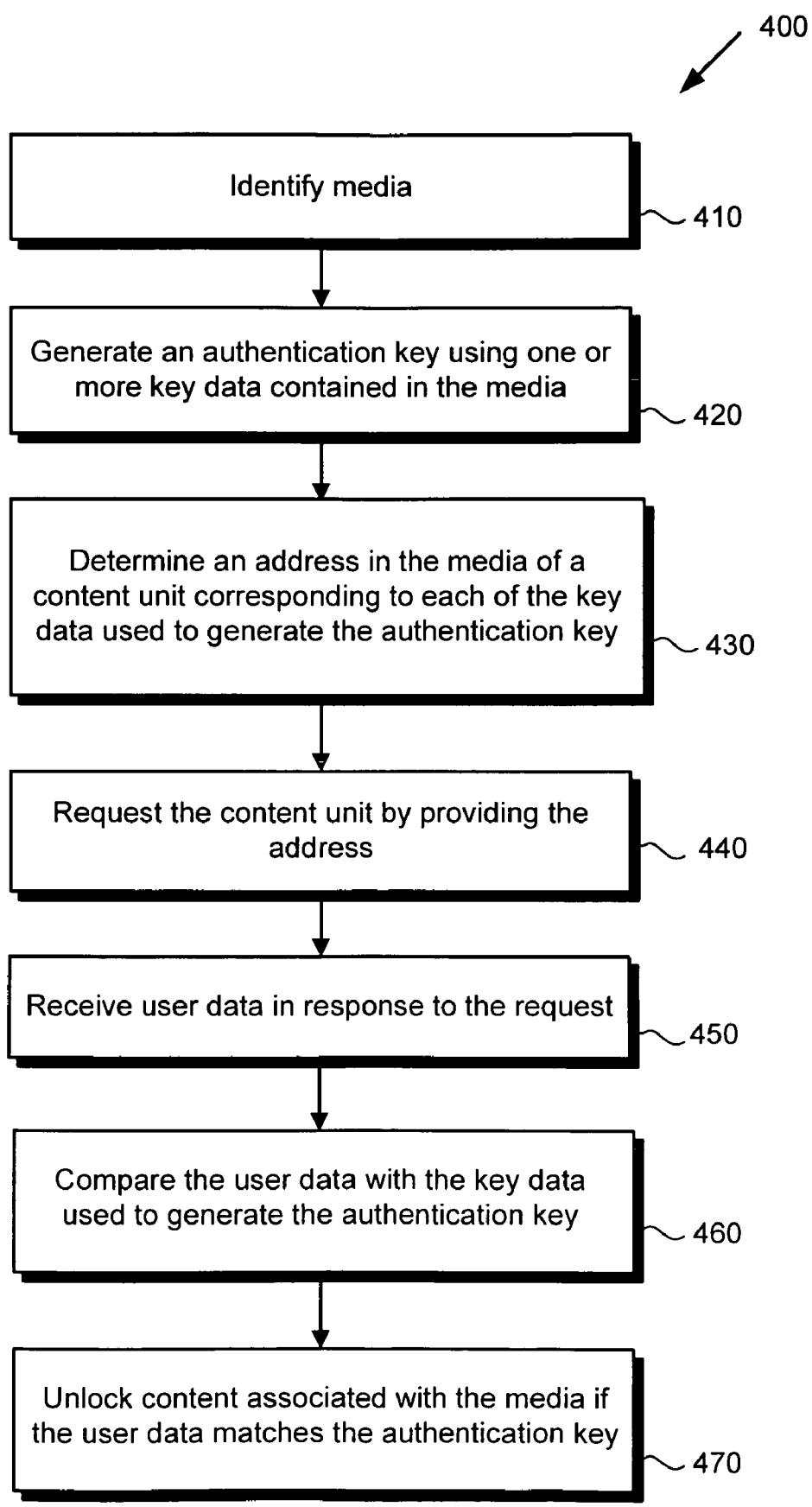

SYSTEM AND METHOD FOR UNLOCKING CONTENT ASSOCIATED WITH MEDIA

RELATED APPLICATIONS

This application claims priority to U.S. Provisional Application No. 61/196,875, filed on Oct. 20, 2008, which is hereby incorporated by reference in its entirety.

BACKGROUND OF THE INVENTION

1. Field of the Invention

The present invention relates generally to the management of media content. More particularly, the present invention relates to systems and methods for unlocking content associated with media.

2. Background Art

Developments in the technology for supporting information processing and delivery have made more content more widely available to consumers than ever before. As the richness and variety of that content has grown, so too have the expectations of consumers, so that a consumer may now typically expect to be able to access a desired content across multiple formats, and/or be provided with supplemental content or other associated content capable of enriching or extending the consumption experience.

In the case of digitally recorded content, for example, it is now quite common for entertainment content provided on a digital video disc (DVD) or high-definition optical disc, such as a Blu-ray disc, for example, to be distributed as a content bundle including primary content and supplemental content associated with the primary content. For instance, primary content comprising a movie may be bundled with supplemental content related to the making of the movie, biographies of actors and actresses featured in the movie, alternate scenes omitted from the primary version of the movie, and the like. In addition, in some instances the primary content may be bundled with associated content not packaged and distributed with the primary content, but available to the purchaser of the primary content through another distribution channel.

Consider, for example, the previously introduced scenario in which primary movie content is distributed for commercial sale as a DVD. In that instance, associated content may include the primary content in another media format, such as streaming media available for consumption and/or download over the Internet, for example. Alternatively, associated content may comprise other movies thematically related to the primary movie content, or a music soundtrack of the primary movie content. In any of those situations, the consumer of the primary content may have the opportunity to access the associated content by virtue of their purchase of the primary content. The purchased DVD may have encoded onto it an access code or other authentication data that the consumer may utilize to identify themselves as being in possession of the DVD and therefore entitled to access the associated content on the agreed upon terms. As a result, the consumer may enjoy an extended consumption experience through access to the associated supplemental content.

However, media distributed to consumers in certain more traditional formats predating the recent trend towards content bundling may not readily lend themselves to such an extendable consumption experience. Due in part to the use of batch production for much of this content, as well as the requirement that the content be directly readable by a human consumer, content such as traditional printed media, for example, may be difficult or prohibitively expensive to mark individually with unique authentication symbols. This is problematic, however, because printed media, such as books and magazines, are physically bulky formats having a relatively low content density, so that the ability to associate the purchased content with separate but associated supplemental content may be especially desirable in these very situations in which it is most difficult to accomplish.

FIGS. 1A and 1B show conventional solutions for providing a consumer of media with an authentication key to unlock associated content. Conventional package 100a, in FIG. 1A, includes media 102, in the form of a book, enclosed in wrapper 106. As shown in FIG. 1A, authentication key 104, which may be an alphanumeric code, for example, is printed onto or attached to wrapper 106. Wrapper 106 may be a shrinkwrap cover protecting media 102 during distribution or display, for example. Authentication key 104 may be air printed onto wrapper 106, or printed onto an adhesive label affixed to wrapper 106. A consumer in possession of package 100a can enjoy media 102, and utilize authentication key 104 to access, or unlock, supplemental content associated with media 102.

Turning to FIG. 1B, conventional package 100b in that figure includes media 102, again represented as a book, and authentication key 104 provided on insert 108, which is distributed with media 102. As in the previous figure, a consumer in possession of package 100b may enjoy media 102, and utilize authentication key 104 to access, or unlock, supplemental content associated with media 102. One advantage of the conventional solutions shown by FIGS. 1A and 1B is that otherwise indistinguishable units of packaged media, such as multiple copies of the book represented by media 102, are rendered distinctive and identifiable by being distributed with a physically separable object, i.e., wrapper 106 or insert 108, which bears a unique authentication key.

The disadvantages associated with the solutions shown by FIGS. 1A and 1B are several and significant, however. For example, because for both packages 100a and 100b, authentication key 104 is provided on an object separable from media 102, and produced independently from media 102, those separable objects, i.e., wrapper 106 or insert 108, must be combined with media 102 prior to their distribution to a consumer. That required combining step may be labor or resource intensive, as well as time consuming, and may represent a substantial additional production or distribution cost. In addition, and perhaps even more disadvantageously, because authentication key 104 is not bonded to media 102, but rather to physically separable wrapper 106 or insert 108, authentication key 104 may fairly readily be separated from media 102.

Separation of authentication key 104 from media 102 can have undesirable consequences for the consumer as well as for the producer and/or distributor of media 102. For example, the consumer may be disadvantaged through loss of access to supplemental content associated with media 102, when authentication key 104 is separated from media 102 either intentionally, through theft of wrapper 106 or insert 108 during distribution and display, or inadvertently, through discard or loss of those separate objects by the consumer. Moreover, the producer and/or distributor may suffer harm as a result of unauthorized distribution of supplemental content to individuals in improper possession of authentication key 104, again, as a result of theft during distribution and display, or, alternatively, through intentional sharing of authentication key 104 by the consumer. In instances in which a purchasing consumer is deprived of or loses authentication key 104, the producer and/or distributor may additionally suffer a loss of good will from the consumer, which may negatively affect the prospects of future purchases of other products offered by the producer and/or distributor of media 102.

Accordingly, there is a need in the art for a new solution to overcome the drawbacks and deficiencies in the conventional approaches for authenticating media.

SUMMARY OF THE INVENTION

There are provided systems and methods for unlocking content associated with media, substantially as shown in and/or described in connection with at least one of the figures, as set forth more completely in the claims.

BRIEF DESCRIPTION OF THE DRAWINGS

The features and advantages of the present invention will become more readily apparent to those ordinarily skilled in the art after reviewing the following detailed description and accompanying drawings, wherein:

FIG. 4 is a flowchart presenting a method to unlock content associated with media, according to one embodiment of the present invention.

DETAILED DESCRIPTION OF THE INVENTION

Figure 1A:
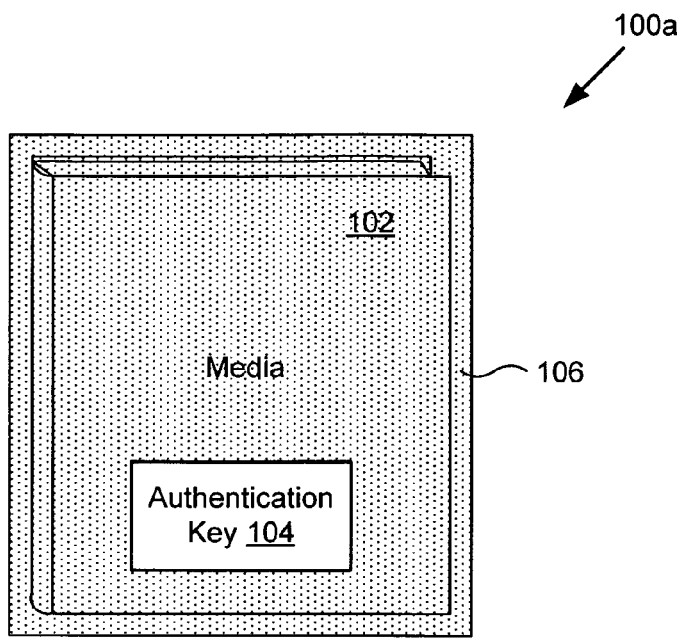
FIG. 1A shows a conventional solution for providing a consumer of media with an authentication key to unlock associated content.
Figure 1B:
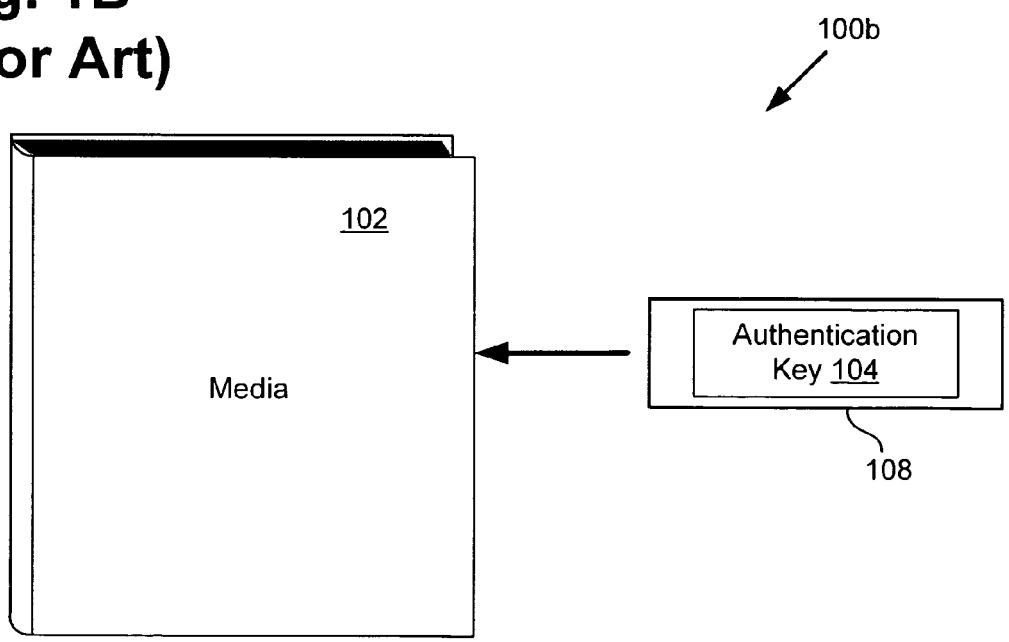
FIG. 1B shows another conventional solution for providing a consumer of media with an authentication key to unlock associated content.

The present application is directed to a system and method for unlocking content associated with media. The following description contains specific information pertaining to the implementation of the present invention. One skilled in the art will recognize that the present invention may be implemented in a manner different from that specifically discussed in the present application. Moreover, some of the specific details of the invention are not discussed in order not to obscure the invention. The specific details not described in the present application are within the knowledge of a person of ordinary skill in the art. The drawings in the present application and their accompanying detailed description are directed to merely exemplary embodiments of the invention. To maintain brevity, other embodiments of the invention, which use the principles of the present invention, are not specifically described in the present application and are not specifically illustrated by the present drawings. It should be borne in mind that, unless noted otherwise, like or corresponding elements among the figures may be indicated by like or corresponding reference numerals.

Figure 2:
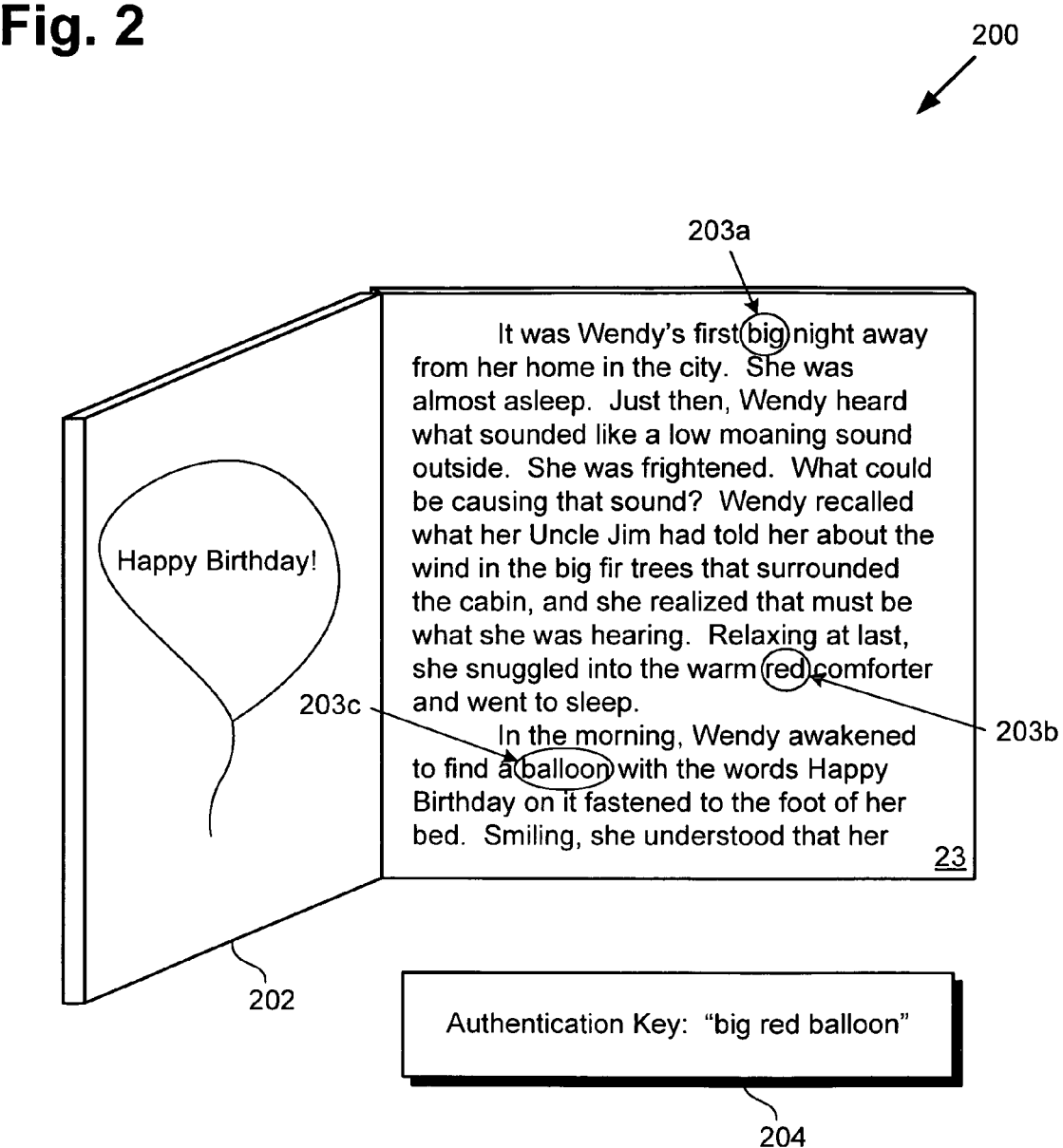
FIG. 2 shows an example of media provided so as to enable unlocking of associated content by a consumer in possession of the media, according to one embodiment of the present invention.

The inventor recognizes the drawbacks and deficiencies in the conventional art, and has developed a novel solution for unlocking content associated with media that successfully overcomes the failings of conventional approaches. FIG. 2 shows an example of media provided so as to enable unlocking of associated content by a consumer in possession of the media, according to one embodiment of the present invention. Package 200, in FIG. 2, shows media 202, in the form of a book, having authentication key 204 selected from the contents of media 202, or in the present embodiment, from individual human readable words making up the text of the book.

Figure 3:
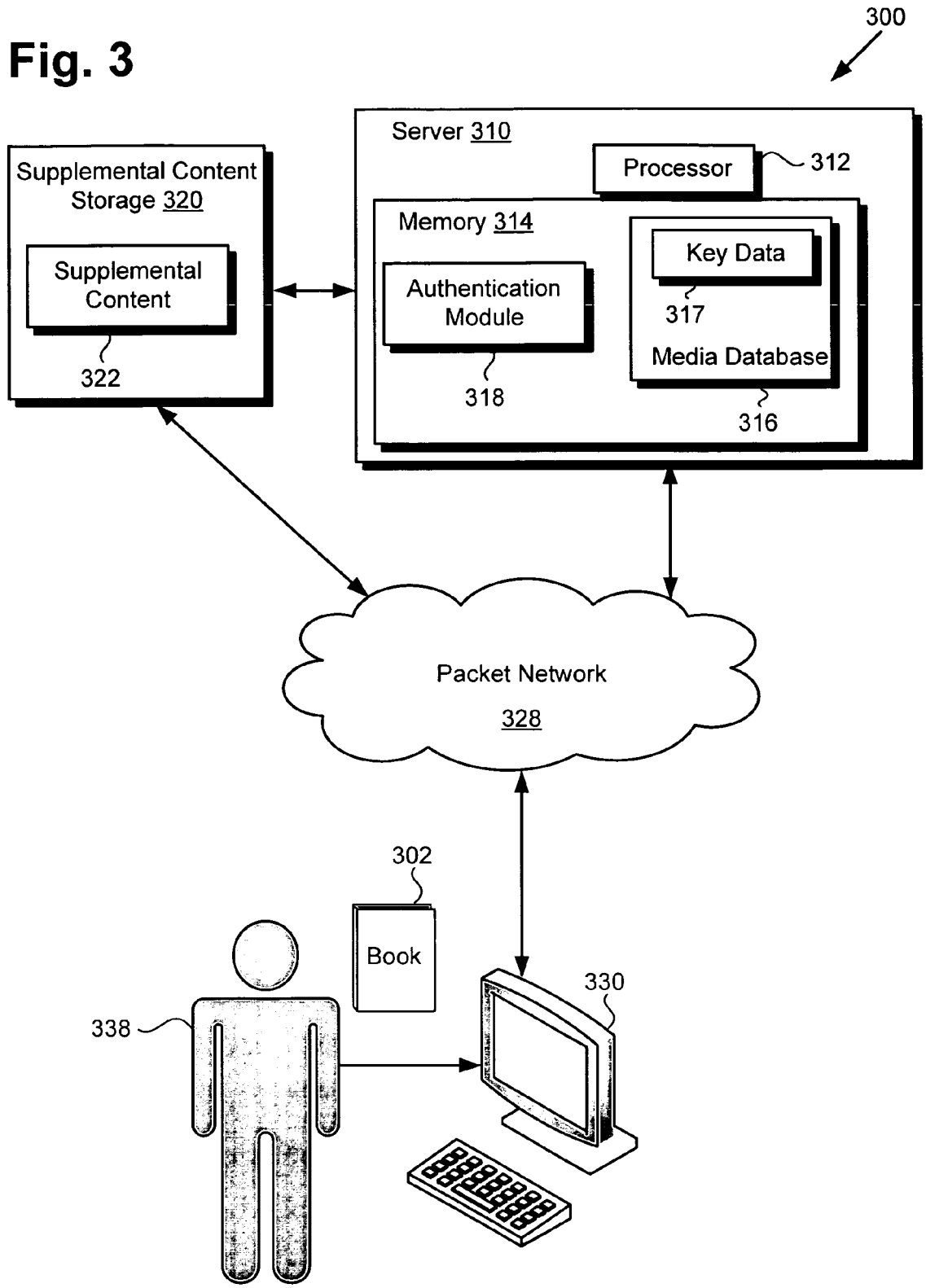
FIG. 3 shows a block diagram of a system for unlocking content associated with media, according to one embodiment of the present invention.

The mechanism by which the result shown in FIG. 2 is accomplished will be more fully explained in conjunction with following FIGS. 3 and 4. For the time being, it is enough to appreciate that according to the various embodiments of the present invention, authentication key 204 is fully integrated with, and not physically separable from media 202. As a result, authentication key 204 cannot be lost or discarded by a consumer of media 202, independently of media 202, making it less likely that the consumer would inadvertently relinquish access to associated content unlocked by authentication key 204. Moreover, the consumer cannot suffer loss of authentication key 204 through theft during distribution or display of media 202 because authentication key 204 is derived from the purchased product itself, in other words, from the contents of the media. In addition, because authentication key 204 cannot be separated from media 202, and as will be explained shortly, may be generated dynamically through interaction of the consumer with a content coordinator or content coordination system, the consumer cannot share authentication key 204 with others without relinquishing possession of media 202, making improper distribution of the associated content unlocked by authentication key 204 less likely.

As shown in FIG. 2, authentication key 204 comprises the three words "big red balloon" corresponding to combination of the words "big" 203a, "red" 203b, and "balloon" 203c, appearing in the text on page twenty-three of the book represented by media 202. Thus, considering the number of words contained in a typical printed media, the number of letters making up those words, and the possible combinations of the words and/or letters, a practically infinite number of authentication keys can be generated from the contents of media 202. The consumer in possession of media 202 may be unable to identify authentication key 204 within those contents without guidance, however. That guidance may be provided by a content coordinator, in the form of a web server, accessible online through a personal computer or other client system, or through voice or data communication with a human customer service representative acting in that capacity, for example. Whatever form it takes, the content coordinator can guide the consumer to particular addresses or locations within media 202, at which elements of authentication key 204 have been determined to reside.

According to the embodiment of FIG. 2, for example, a consumer in possession of media 202 and attempting to access supplemental content associated with media 202 would be prompted to turn to page twenty-three of the book and combine, in order, the fifth word from the beginning of the first paragraph (i.e., "big" 203a), the sixth word from the end of the first paragraph (i.e., "red" 203b), and the ninth word from the beginning of the second paragraph (i.e., "balloon" 203c), to produce the combination "big red balloon," matching authentication key 204. Although in the present embodiment, media 202 is represented as a book, in other embodiments media 202 may correspond to any human readable content that is packaged for distribution to consumers. Thus, for the purposes of the present application, media may comprise any printed media such as books, magazines, newsletters, or other periodicals, for example, or any other discrete arrangement of meaningful colors, shapes, or symbols, such as scrolls, etched or inlaid surfaces, playing or trading cards, or game boards, for example.

Furthermore, although in the embodiment of FIG. 2, authentication key 204 is shown to comprise three human readable words selected from a common page of a book, in other embodiments authentication key 204 may comprise more or fewer content units, which may themselves be human readable words, symbols, raised or indented elements, or colors, for example, or combinations of such content units. In those embodiments, the one or more content units comprised by encryption key 204 need not be commonly located on the same page or reside together in a distinguishable subset of the media, such as a section or chapter, for example. Thus, the content units comprised by authentication key 204 may be as few as one, or may be numerous, and may be widely separated across the contents of media 202. In addition to the representation of authentication key 204 as comprising human readable words, as shown in FIG. 2, in other situations in which media 202 is a book or other printed media, for example, the key data from which authentication key 204 is generated may include information such as the number of words in a particular line, or the identities of specific letters located at an address on a line. For example, in those embodiments, key data may include numbers, such as the number of words on line fourteen of page twenty-four, or individual letters, such as the fifth letter of the third word on line five of page twenty-one, and the like.

The mechanism by which authentication key 204 is generated for media 202 and identified by a consumer in possession of media 202 will now be further explained by reference to FIG. 3. FIG. 3 shows a block diagram of system 300 for unlocking content associated with media, according to one embodiment of the present invention. System 300 comprises server 310 interactively linked to supplemental content storage 320 including supplemental content 322. As shown in FIG. 3, server 310 includes processor 312, memory 314 storing key data 317 in media database 316, and authentication module 318. Authentication module 318, under the control of processor 312, is capable of accessing data stored in media database 316. FIG. 3 also shows consumer 338 in possession of book 302, in communication with system 300 through client system 330 and packet network 328. Book 302, in FIG. 3, corresponds to media 202, in FIG. 2, while key data 317 comprises data which corresponds to content units within book 302 (content units not shown in FIG. 3), which in turn may be seen to correspond to the content unit human readable words "big" 203*a*, "red" 203*b*, and "balloon" 203*c*, in FIG. 2.

According to the embodiment of FIG. 3, consumer 338 may utilize client system 330 and packet network 328 to access server 310. Server 310 may then utilize processor 312 to interact with authentication module 318 and unlock supplemental content 322 associated with book 302. Supplemental content 322 associated with the media (e.g., book 302) may comprise one or more digital media files, for example, containing content relevant to book 302. In some embodiments, unlocking supplemental content 322 may correspond to authorizing temporary or permanent access to content associated with the media, such as one or more digital media files residing in supplemental content storage 320. In other embodiments, however, unlocking supplemental content 322 may authorize consumer 338 to subsequently arrange for transfer of supplemental content 322, such as one or more digital media files, to his or her possession, perhaps through purchase and/or download of supplemental content 322 to client system 330 over packet network 328, for example.

It is noted that although in the present embodiment, supplemental content 322 has been described as comprising one or more digital media files, that is merely an example of the form supplemental content 322 may take. In other embodiments, supplemental content 322 associated with the media may comprise other items of media, such as printed media, recorded video or film content, recorded music content, or objects, such as tokens, plush toys, or prizes, for example. Moreover, although in the embodiment of FIG. 3, client system 330 is represented as a personal computer (PC), in other embodiments client system 330 may correspond to another type of personal communication device, such as a mobile telephone, digital media player, personal digital assistant (PDA), tablet computer, or a wired or wireless gaming console, for example.

As shown in FIG. 3, in one embodiment, unlocking of supplemental content 322 associated with book 302 is mediated directly by authentication module 318 on server 310, accessed through packet network 328. In that embodiment, authentication module 318 may comprise a web application, accessible over a packet network such as the Internet, for example. In other embodiments, however, unlocking of supplemental content 322 may be mediated by a human content coordinator utilizing authentication module 318, such as a customer service representative engaging in voice or data communication with consumer 338, for example. Furthermore, it is noted that although in the embodiment of FIG. 3, supplemental content storage 320 is shown to reside apart from server 310, such as, for example where distribution of supplemental content 322 is managed by a content distribution clearinghouse, in other embodiments, supplemental content 322 may be stored on server 310.

Media database 316 includes key data 317, which comprises a set of key data corresponding to the content units, in this case human readable words, making up the text of book 302, as well as the addresses in book 302, i.e., page number, paragraph or line number, and word number, for example, of each word. As a result, the words and the locations of those words, which may constitute the entire contents of book 302, are represented in media database 316 and those representations are accessible by authentication module 318 under the control of processor 312. Authentication module 318, under the control of processor 312, may be configured to identify book 302 by inputs received from consumer 338, generate an authentication key from one or more key data from a set of key data contained in book 302, in this instance human readable words, determine the addresses of those words in book 302, and request the content unit (e.g., word) at each determined address, from consumer 338. Consumer 338 may consult book 302 at the specified locations, and provide the word or word combination requested by authentication module 318. Authentication module 318 may be further configured to receive user data from consumer 338 and compare that user data with the key data used to generate the authentication key, and to unlock supplemental content 322 if the user data matches the authentication key.

Although the present discussion has thus far described authentication module 318, in FIG. 3, as residing on server 310, more generally, authentication module 318 may comprise a software module stored on any suitable computer-readable medium. For example, instructions for performing steps comprising identifying a media, generating an authentication key using one or more key data from a set of key data contained in the media, determining an address in the media of one or more content units corresponding respectively to each of the one or more key data used to generate the authentication key, requesting the at least one content unit at the determined address, receiving user data in response to the request, comparing the user data with the one or more key data used to generate the authentication key, and unlocking the content associated with the media if the user data matches the authentication key, may be stored on a computer-readable medium, for-execution by a processor.

The expression "computer-readable medium," as used in the present application, refers to any medium that provides instructions to a computer or processor, such as processor 312 on server 310, in FIG. 3. Thus, a computer-readable medium may correspond to various types of media, such as volatile media, non-volatile media, and transmission media, for example. Volatile media may include dynamic memory, such as dynamic random access memory (dynamic RAM), while non-volatile memory may include optical, magnetic, or electrostatic storage devices. Transmission media may include coaxial cable, copper wire, or fiber optics, for example, or may take the form of acoustic or electromagnetic waves, such as those generated through radio frequency (RF) and infrared (IR) communications. Common forms of computer-readable media include, for example, a compact disc read-only memory (CD-ROM), DVD, or other optical disc; a RAM, programmable read-only memory (PROM), erasable PROM (EPROM), FLASH memory, or a transmission carrier wave.

FIGS. 2 and 3 will now be further described in conjunction with FIG. 4, which presents a flowchart of a method for execution by a processor to unlock content associated with media, according to one embodiment of the present invention. The steps shown in flowchart 400 are merely exemplary, however, so that a step may consist of one or more substeps or may involve specialized equipment or materials, as known in the art. While steps 410 through 470 indicated in flowchart 400 are sufficient to describe one embodiment of the present method, other embodiments may utilize steps different from those shown in flowchart 400, or may include more, or fewer steps.

Beginning with step 410 in FIG. 4, and referring to system 300 in FIG. 3, step 410 of flowchart 400 comprises identifying the media, or, as in the embodiment of FIG. 3, identifying book 302. Identification of book 302 may be performed by authentication module 318, under the control of processor 312, for example, from inputs provided by consumer 338 seeking to access and unlock supplemental content 322 associated with book 302. Authentication module 318 may identify book 302 by comparison of identifying data provided by consumer 338 to the contents of media database 316, for example.

Flowchart 400 continues with step 420, comprising generating an authentication key using one or more key data from a set of key data contained in the media. Step 420 may be performed by authentication module 318, under the control of processor 312, for example, by accessing media database 316 in which key data 317 are stored. Referring to FIG. 2, a set of key data contained by media 202 may include all words contained in media 202, including every word appearing on displayed page twenty-three, for example. In one embodiment, generation of authentication key 204 may be performed by processor 312 and authentication module 318, in FIG. 3, using a random sequence generator, or other suitable algorithm for selecting key data corresponding to the individual words making up "big red balloon." Although authentication key 204 is shown to include three words, in other embodiments, authentication key 204 may comprise only one word, or two words, or more than three words, for example. In still other embodiments, authentication key 204 may comprise the number and/or identity of specific letters located on one or more pages of media 202.

In step 430 of flowchart 400, the address or location in the media, of the content unit corresponding respectively to each of the key data used to generate the authentication key, is determined. Once again, step 430 may be performed by authentication module 318, under the control of processor 312, by reference to media database 316. In the embodiment of FIG. 2, for example, three key data were used to generate authentication key 204. Those three key data correspond to the three content units, in that case human readable words, "big" 203a, "red" 203b, and "balloon" 203d. The addresses of those words may be determined according to various criteria, such as page number, line number, paragraph number, word number, and the like, to describe the location of each content unit.

Step 440 comprises requesting the content unit at each address determined in step 440. Step 440 may correspond to a message being generated by authentication module 318, under the control of processor 312, being sent from server 310 to client system 330, for example, requesting the user of client system 330, e.g. consumer 338, to provide the content unit or units appearing at the specified respective address or addresses. In the embodiment shown in FIG. 2, for example, such a message may request the user to input, in order, the fifth word from the beginning of the first paragraph on page twenty-three, the sixth word from the end of the first paragraph on the same page, and the ninth word from the beginning of the second paragraph on that page. Authentication module 318, under the control of processor 312, may then, in step 450 of the method of flowchart 400, receive user data responsive to the request issued in step 440.

Continuing with step 460 of flowchart 400, step 460 comprises comparing the user data with the key data used to generate the authentication key in step 420. Step 460 may be performed by authentication module 318, under the control of processor 312, by reference to key data 317 in media database 316. Where the user, e.g. consumer 338, in FIG. 3, is actually in possession of the media, such as media book 202, in FIG. 2, authentication key 204 can be readily provided through compliance with the request issued in step 440. For example, consulting the instructions provided in the previous paragraph, we find that the requested content units are the words "big" 203a, "red" 203b, and "balloon" 203c, which, in the requested order, match authentication key 204.

Thus, when a legitimate attempt to unlock supplemental content 322 is undertaken by consumer 338 in possession of book 302, consumer 338 is able to provide the content units requested in step 440. As a result, step 470 of flowchart 400 comprises unlocking associated supplemental content 322 if the user data received from consumer 338 in step 450 matches authentication key 204, shown in FIG. 2. Step 470 may correspond to directions provided by authentication module 318, under the control of processor 312, to supplemental content storage 320, unlocking access to supplemental content 322 for consumer 338 on agreed upon terms, for example. Where an individual other than consumer 338 attempts to access supplemental content 322 associated with book 302, but is not in possession of book 302, however, the request issued in step 440 cannot be complied with, advantageously disabling access to associated supplemental content 322 for that individual, under those circumstances.

Thus, the present application discloses a system and method for unlocking content associated with media. From the above description of the invention it is manifest that various techniques can be used for implementing the concepts of the present invention without departing from its scope. Moreover, while the invention has been described with specific reference to certain embodiments, a person of ordinary skill in the art would recognize that changes can be made in form and detail without departing from the spirit and the scope of the invention. It should also be understood that the invention is not limited to the particular embodiments described herein, but is capable of many rearrangements, modifications, and substitutions without departing from the scope of the invention.

What is claimed is:

1. A system for unlocking a content associated with a printed media, the system comprising:
    a server memory configured to store a media database having a set of key data directly corresponding to one or more content units making up the printed media; and
    a server processor configured to execute an authentication module residing in the server memory, the authentication module configured to:
        generate an authentication key using at least one key data from the set of key data;
        determine an address in the printed media of at least one content unit corresponding respectively to each of the at least one key data used to generate the authentication key;
        provide the address to the user;
        request, from the user, to provide data corresponding to the address from the printed media;
        receive, from the user, the data in response to the request;
        compare the data with the at least one key data used to generate the authentication key; and
        unlock the content associated with the printed media if the data matches the authentication key.

2. The system of claim 1, wherein the printed media comprises one of a book or a periodical publication.

3. The system of claim 1, wherein the printed media comprises one of a trading card or a game board.

4. The system of claim 1, wherein the authentication key includes a human readable word selected from the contents of the printed media.

5. The system of claim 1, wherein the content associated with the printed media comprises a digital media file.

6. The system of claim 5, wherein unlocking the content associated with the printed media includes authorizing the user of a client system to access the digital media file.

7. The system of claim 5, wherein unlocking the content associated with the printed media includes authorizing the user to transfer the digital media file to a client system.

8. A computer-readable storage device having stored thereon instructions comprising an authentication software module which, when executed by a processor, perform a method for unlocking a content associated with a printed media, the method comprising:
    generating an authentication key using at least one key data from a set of key data directly corresponding to one or more content units making up the media;
    determining an address in the printed media of at least one content unit corresponding respectively to each of the at least one key data used to generate the authentication key;
    providing the address to the user;
    requesting, from the user, to provide data corresponding to the address from the printed media;
    receiving, from the user, the data in response to the requesting;
    comparing the data with the at least one key data used to generate the authentication key; and
    unlocking the content associated with the printed media if the data matches the authentication key.

9. The computer-readable storage device of claim 8, wherein the authentication key includes a human readable word selected from the contents of the printed media.

10. The computer-readable storage device of claim 8, wherein the content associated with the printed media comprises a digital media file.

11. A method for execution by a processor to unlock a content associated with a printed media, the method comprising:
    generating an authentication key using at least one key data from a set of key data directly corresponding to one or more content units making up the media;
    determining an address in the printed media of at least one content unit corresponding respectively to each of the at least one key data used to generate the authentication key;
    providing the address to the user;
    requesting, from the user, to provide data corresponding to the address from the printed media;
    receiving, from the user, the data in response to the requesting;
    comparing the data with the at least one key data used to generate the authentication key; and
    unlocking the content associated with the printed media if the data matches the authentication key.

12. The method of claim 11, wherein the printed media comprises one of a book or a periodical publication.

13. The method of claim 11, wherein the printed media comprises one of a trading card or a game board.

14. The method of claim 11, wherein the authentication key includes a human readable word selected from the contents of the printed media.

15. The method of claim 11, wherein the content associated with the printed media comprises a digital media file.

16. The method of claim 15, wherein unlocking the content associated with the printed media includes authorizing the user of a client system to access the digital media file.

17. The method of claim 15, wherein unlocking the content associated with the printed media includes authorizing the user to transfer the digital media file to a client system.

* * * * *